(12) United States Patent
Shirasaki

(10) Patent No.: US 8,582,077 B2
(45) Date of Patent: Nov. 12, 2013

(54) PELLICLE, MOUNTING METHOD THEREFOR, PELLICLE-EQUIPPED MASK, AND MASK

(75) Inventor: Toru Shirasaki, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 303 days.

(21) Appl. No.: 13/052,624

(22) Filed: Mar. 21, 2011

(65) Prior Publication Data

US 2011/0235016 A1 Sep. 29, 2011

(30) Foreign Application Priority Data

Mar. 29, 2010 (JP) ................................. 2010-074193

(51) Int. Cl.
G03B 27/52 (2006.01)
G03B 27/62 (2006.01)

(52) U.S. Cl.
USPC .............................................. 355/30; 355/75

(58) Field of Classification Search
CPC ............... G03F 1/00; G03F 1/14; G03F 1/62; G03F 1/64; G03F 1/142; G03F 7/70983
USPC ................. 355/30, 53, 75, 77; 430/5
See application file for complete search history.

(56) References Cited

U.S. PATENT DOCUMENTS

| 6,303,196 B1 * | 10/2001 | Funatsu | 428/14 |
| 6,984,475 B1 * | 1/2006 | Levinson et al. | 430/5 |
| 2007/0092807 A1 * | 4/2007 | Fukushima et al. | 430/5 |

FOREIGN PATENT DOCUMENTS

| JP | 58-58856 U | 5/1981 |
| JP | 61-193454 U | 12/1986 |
| JP | 1-167758 A | 7/1989 |
| JP | 2000194122 A * | 7/2000 |
| JP | 2008-65258 A | 3/2008 |
| KR | 2008-099922 A * | 11/2008 |

OTHER PUBLICATIONS

Office Action issued Aug. 7, 2012, in Japanese Patent Application No. 2010-074193.
Office Action issued Mar. 26, 2012, in Japanese Patent Application No. 2010-074193.

* cited by examiner

*Primary Examiner* — Toan Ton
*Assistant Examiner* — Colin Kreutzer
(74) *Attorney, Agent, or Firm* — Birch, Stewart, Kolasch & Birch, LLP

(57) ABSTRACT

A pellicle is provided that includes a pellicle film, a pellicle frame having the pellicle film stretched over one end face thereof and having the other end face open, and a pressure-sensitive adhesion layer for adhering the pellicle frame to a mask, the pressure-sensitive adhesion layer being provided on an inner peripheral face of the pellicle frame, and the pressure-sensitive adhesion layer being capable of adhering to a side face of a mask having a mask image on a front face. There are also provided a method of mounting a pellicle that includes fixing to a side face of a mask an inner peripheral face of a pellicle frame of a pellicle that includes a pellicle film and a pellicle frame having the pellicle film stretched over one end face thereof and having the other end face open, a method of mounting a pellicle that includes adhering the pellicle to a side face of the mask that is inclined in going from the reverse face of the mask toward the front face where the mask image is provided, thus adhering the side face of the mask to the pellicle frame inner peripheral face, a pellicle-equipped mask that includes the pellicle adhered to a mask, and a mask that includes a side face that is inclined in going toward the front face where a mask image is provided.

8 Claims, 5 Drawing Sheets

PELLICLE, MOUNTING METHOD THEREFOR, PELLICLE-EQUIPPED MASK, AND MASK

BACKGROUND OF THE INVENTION

1. Field of the Invention

The present invention relates to a pellicle for lithography that is used as a debris shield for a lithographic mask when producing a liquid crystal display panel or a semiconductor device such as an LSI or a ULSI, a mounting method therefor, a pellicle-equipped mask, and a mask.

2. Description of Related Art

In the production of a semiconductor such as an LSI or a VLSI or the production of a liquid crystal display panel, a pattern is formed by irradiating a semiconductor wafer or a liquid crystal substrate with light through an exposure master plate; if debris is attached to the exposure master plate used here, since the debris absorbs the light or bends the light, there are the problems that the replicated pattern is deformed, the edge becomes rough, or the background is stained black, thus impairing the dimensions, quality, appearance, etc. The 'exposure master plate' referred to in the present invention is a general term for lithographic masks and reticles.

These operations are usually carried out in a clean room, but even within a clean room it is difficult to always keep the exposure master plate clean, and a method is therefore employed in which a pellicle that allows exposure light to easily pass through is adhered to the surface of the exposure master plate to act as a debris shield.

The pellicle is basically constituted of a pellicle frame and a pellicle film stretched over the frame. The pellicle film is formed from nitrocellulose, cellulose acetate, a fluorine-based polymer, etc., which allows exposure light (g rays, i rays, 248 nm, 193 nm, etc.) to easily pass through. The pellicle film is adhered by coating the upper end part of the pellicle frame with a good solvent for the pellicle film and air-drying or by means of an adhesive such as an acrylic resin, an epoxy resin, or a fluorine resin. Furthermore, in order to mount an exposure master plate, a lower end part of the pellicle frame is provided with a pressure-sensitive adhesion layer made of a polybutene resin, a polyvinyl acetate resin, an acrylic resin, a silicon resin, etc. and a reticle pressure-sensitive adhesive protecting liner for the purpose of protecting the pressure-sensitive adhesive layer.

The pellicle is installed so as to surround a pattern region formed on the surface of the exposure master plate. Since the pellicle is provided in order to prevent debris from becoming attached to the exposure master plate, this pattern region and a pellicle outer part are separated so that dust from the pellicle outer part does not become attached to the pattern face.

In recent years, the LSI design rule has shrunk to sub-quarter micron, and accompanying this the wavelength of an exposure light source is being shortened, that is, instead of g lilne (436 nm) and i line (365 nm) from the hitherto predominant mercury lamp, a KrF excimer laser (248 nm), an ArF excimer laser (193 nm), etc. are being used. As shrinkage advances, the flatness required for the mask and silicon wafer becomes more strict.

A pellicle is affixed to a mask in order to shield a pattern from debris after the mask is completed. When a pellicle is affixed to a mask, the mask flatness can sometimes change. When the mask flatness is degraded, as described above there is a possibility that a problem such as defocusing will occur. Furthermore, when the flatness changes, a pattern shape drawn on the mask changes, and this brings about the difficulty that problems occur with the precision of superimposition of the mask.

There are several factors involved in the change in mask flatness due to a pellicle being affixed, but it has been found that the largest factor is the flatness of the pellicle frame.

The pellicle is affixed to a mask via a mask pressure-sensitive adhesive present on one side of the pellicle frame; when the pellicle is affixed to a mask, the pellicle is usually pressed against the mask with a force of on the order of 20 to 30 kgf. In general, the flatness of the mask is a few μm or less as a TIR value, and is 1 μm or less for a state-of-the-art mask, and the flatness of the pellicle frame is generally on the order of a few tens of μm, which is large compared with the mask. Because of this, when the pellicle is affixed to the mask, the flatness of the mask might change due to unevenness of the frame. Here, it might be thought that by increasing the flatness of the pellicle frame so that it is as high as the flatness of the mask it would become possible to reduce the change in flatness of the mask.

The pellicle frame is generally formed from an aluminum alloy. With regard to a pellicle frame for semiconductor lithography, the width is on the order of 150 mm, the length is on the order of 110 to 130 mm, and it is generally formed from a pellicle frame bar having a rectangular cross-section. A frame is generally prepared by cutting out a pellicle frame shape from an aluminum alloy plate or extrusion-molding an aluminum material into a frame shape, but since the width is as narrow as on the order of 2 mm and it is easy to deform, it is not easy to produce a flat frame. Because of this, it is very difficult to make the pellicle frame have a flatness of the same degree as that of the mask.

In order to prevent deformation of the mask due to deformation of the pellicle frame, JP-A-2008-65258 (JP-A denotes a Japanese unexamined patent application publication) discloses a pellicle in which the thickness of a mask pressure-sensitive adhesive via which the pellicle is affixed to a mask is at least 0.4 mm, and a pellicle for which the modulus of elasticity at 23° C. of the mask pressure-sensitive adhesive is no greater than 0.5 MPa.

SUMMARY OF THE INVENTION

In recent years, with regard to the flatness required for a mask, from a flatness of 2 μm on the pattern face the requirement is gradually becoming more strict, and for 65 nm node and beyond, preferably 0.5 μm or less and more preferably 0.25 μm is now required.

In general, the flatness of a pellicle frame is on the order of 10 to 30 μm, but if a pellicle employing a pellicle frame having poorer flatness than a mask is affixed to the mask, the shape of the frame is transferred to the mask, thus causing deformation in the mask. When affixing, the pellicle is pressed against the mask with a large force of about 200 to 400 N (20 to 40 kgw). Since the flatness of the mask front face is better than the flatness of the pellicle frame, when pressing of the pellicle against the mask is completed, the pellicle frame attempts to return to its original shape, and the pellicle frame thereby causes the mask to deform.

When the mask is deformed, the mask flatness can sometimes be degraded, and in this case the problem of defocusing within an exposure device occurs. On the other hand, deformation of the mask can sometimes improve the flatness, but even in this case a pattern formed on the mask front face is distorted, and as a result the problem of a pattern image replicated on a wafer by exposure being distorted occurs.

Since this distortion of the pattern also occurs when the mask flatness is degraded, when the mask ends up being deformed by affixing the pellicle, the problem of the pattern image being distorted always occurs.

It is an object of the present invention to provide a pellicle for lithography that can suppress as much as possible deformation of a mask due to deformation of a pellicle frame even if a pellicle is affixed to the mask, a mounting method therefor, a pellicle-equipped mask, and a mask.

The object of the present invention has been achieved by means (1), (4), (7), or (8) below. They are described together with (2), which is a preferred embodiment.

(1) A pellicle comprising a pellicle film, a pellicle frame having the pellicle film stretched over one end face thereof and having the other end face open, and a pressure-sensitive adhesion layer for adhering the pellicle frame to a mask, the pressure-sensitive adhesion layer being provided on an inner peripheral face of the pellicle frame, and the pressure-sensitive adhesion layer being capable of adhering to a side face of a mask having a mask image on a front face, (2) the pellicle according to (1) above, wherein the pressure-sensitive adhesion layer has a thickness that is thinner on the pellicle frame open end face side, the side face of the mask is inclined toward the inside in going from the reverse face of the mask toward the front face where the mask image is provided, and the pressure-sensitive adhesion layer and the mask side face have shapes that conform to each other, (3) the pellicle according to (2) above, wherein when an angle of inclination toward the inside is defined as θ, the relationship of Expression (1) holds.

$$0.1 \leq \tan \theta \leq 0.5 \quad (1)$$

(4) a method of mounting a pellicle comprising a pellicle film and a pellicle frame having the pellicle film stretched over one end face thereof and having the other end face open, the method comprising fixing to a side face of a mask an inner peripheral face of the pellicle frame of the pellicle, (5) the method of mounting a pellicle according to (4) above, wherein fixing is carried out by a pressure-sensitive adhesive provided on the inner peripheral face of the pellicle frame, (6) a method of mounting a pellicle, comprising adhering the pellicle according to (2) or (3) above to a side face of the mask that is inclined toward the inside in going from the reverse face of the mask toward the front face where the mask image is provided, thus adhering the side face of the mask to the pellicle frame inner peripheral face, (7) a pellicle-equipped mask comprising the pellicle according to (1) or (2) above adhered to a mask, and (8) a mask comprising a side face that is inclined toward the inside in going toward the front face where a mask image is provided, and (9) the mask according to (8) above, wherein when an angle of inclination toward the inside is defined as θ, the relationship of Expression (1) holds.

$$0.1 \leq \tan \theta \leq 0.5 \quad (1)$$

DETAILED DESCRIPTION OF THE INVENTION

Figure 4A:
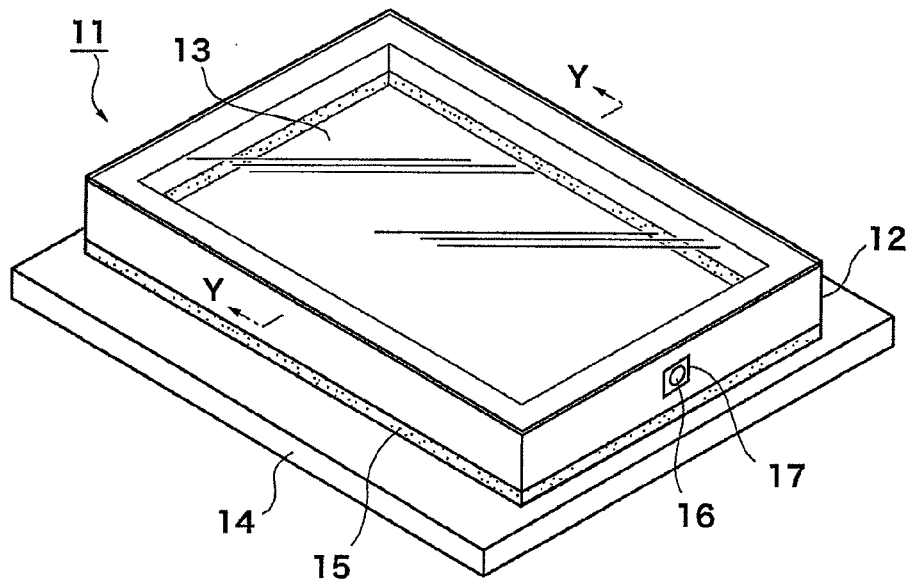
FIG. 4 is a schematic diagram showing the basic constitution of a known pellicle.
Figure 4B:
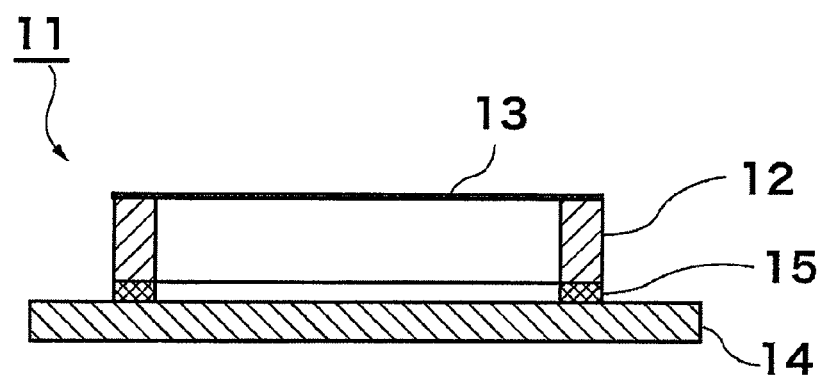

Before explaining the pellicle of the present invention, the basic constitution of a known pellicle is explained by reference to FIG. 4. FIG. 4 (a) is a schematic perspective view showing the basic constitution of a normal pellicle. FIG. 4 (b) is a sectional schematic view showing an example of the cross-sectional constitution of a pellicle-equipped mask on which a known pellicle is mounted.

As shown in FIG. 4, a normal pellicle 11 is formed by stretching a pellicle film 13 over an upper end face of a pellicle frame 13 via an adhesive layer (not illustrated); in this case, a pressure-sensitive adhesion layer 15 for adhering the pellicle 11 to a mask 14 is formed on a lower end face of the pellicle frame 12. The pellicle frame 12 may be provided with an atmospheric pressure adjustment hole (vent) 16, and further with a dust filter 17 for the purpose of removing particles.

In the case of a normal pellicle, as described above, there is the problem that the mask is deformed due to deformation of the pellicle frame when mounted on the mask.

In contrast to the normal pellicle shown in FIG. 4 above, the pellicle of the present invention comprises a pellicle film, a pellicle frame having the pellicle film stretched over one end face thereof and having the other end face open, and a pressure-sensitive adhesion layer for sealing the pellicle frame to a mask, the pressure-sensitive adhesion layer being provided on an inner peripheral face of the pellicle frame, and the pressure-sensitive adhesion layer being capable of adhering to a side face of a mask having a mask image on a front face. In accordance with such a constitution, the pellicle of the present invention can suppress as much as possible deformation of a mask when it is mounted on the mask. Furthermore, the method for mounting a pellicle of the present invention comprises fixing to a side face of a mask an inner peripheral face of a pellicle frame of a pellicle comprising a pellicle film and a pellicle frame having the pellicle film stretched over one end face thereof and having the other end face open. Moreover, the mask of the present invention on which the pellicle of the present invention is mounted comprises a side face that is inclined toward the inside in going toward the front face where a mask image is provided.

The pellicle of the present invention is explained in detail below.

Figure 1A:
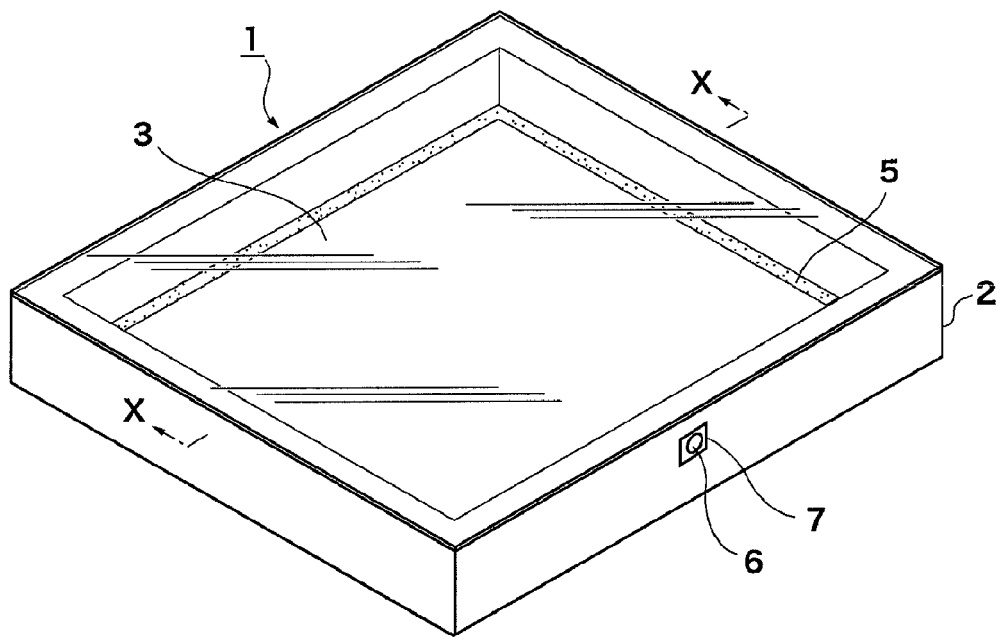
FIG. 1 is a schematic diagram showing the basic constitution of the pellicle of the present invention.
Figure 1B:
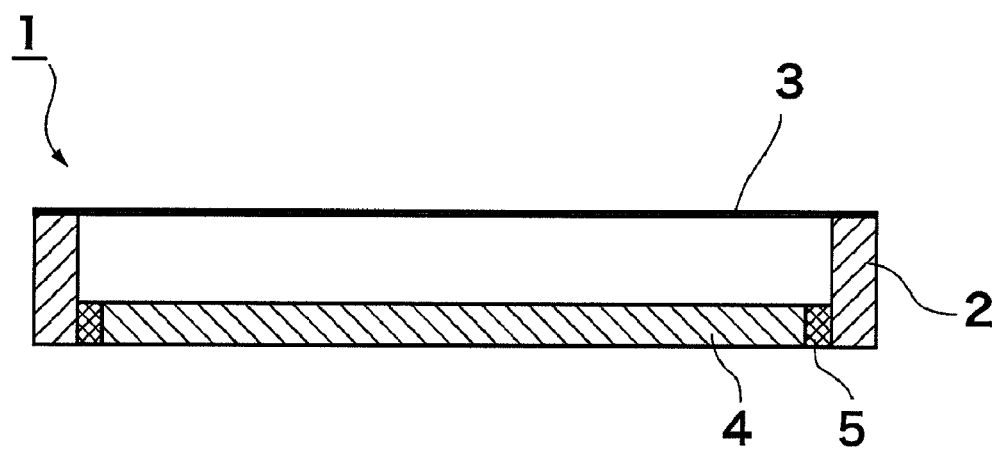
Figure 1C:
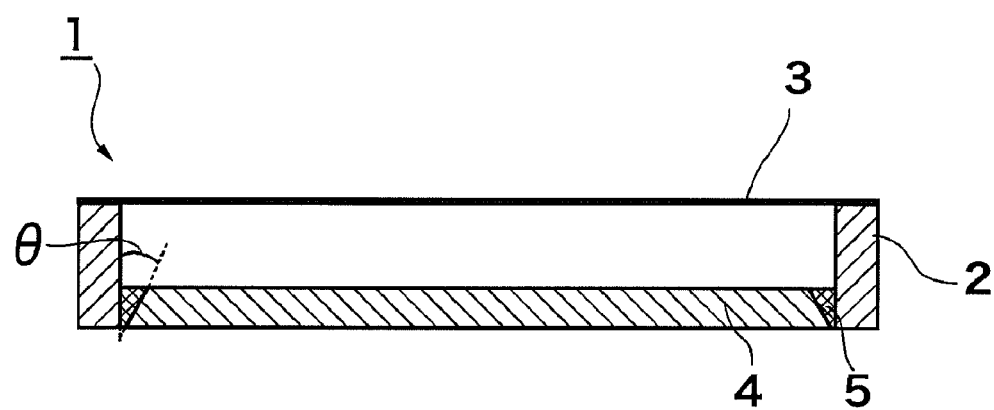

First, the basic constitution of the pellicle of the present invention is explained by reference to FIG. 1. FIG. 1 (a) is a schematic perspective view showing the basic constitution of the pellicle of the present invention. FIG. 1 (b) and FIG. 1 (c) are schematic sectional views showing examples of the cross-sectional constitution of a pellicle-equipped mask on which the pellicle of the present invention is mounted.

As shown in FIG. 1 (a), the pellicle 1 of the present invention comprises a pellicle film 3 stretched over an upper end face of a pellicle frame 2 via an adhesive layer (not illustrated), and in this case a pressure-sensitive adhesion layer 5 for adhering the pellicle 1 to a mask 4 is formed on an inner peripheral face of the pellicle frame 2. Furthermore, an atmospheric pressure adjustment hole (vent) 6 is formed in the pellicle frame 2, and a dust filter 7 may further be provided in order to remove particles.

In a preferred embodiment of the pellicle according to the present invention, the pressure-sensitive adhesion layer has one end provided so as to be substantially flush with the open end face of the pellicle frame.

The dimensions of these pellicle constituent members are similar to those of a normal pellicle, for example, a pellicle for semiconductor lithography, a pellicle for a lithographic step of large liquid crystal display panel production, etc., and the materials thereof may employ known materials.

The type of pellicle film is not particularly limited and, for example, an amorphous fluorine polymer, etc. that has conventionally been used for an excimer laser is used. Examples of the amorphous fluorine polymer include Cytop (product name, manufactured by Asahi Glass Co. Ltd.) and Teflon (Registered Trademark) AF (product name, manufactured by DuPont). These polymers may be used by dissolving them in a solvent as necessary when preparing the pellicle film, and may be dissolved as appropriate in, for example, a fluorine-based solvent.

On the other hand, in the case of a pellicle for EUV exposure, a silicon thin film is preferably used as a pellicle film.

With regard to the base material of the pellicle frame, a conventionally used aluminum alloy material, and preferably a JIS A7075, JIS A6061, JIS A5052 material, etc., is used, but when an aluminum alloy is used it is not particularly limited as long as the strength as a pellicle frame is ensured. The surface of the pellicle frame is preferably roughened by sandblasting or chemical abrasion prior to providing a polymer coating. In the present invention, a method for roughening the surface of the frame may employ a conventionally known method. It is preferable to employ a method for roughening the surface involving blasting the aluminum alloy material surface with stainless steel, carborundum, glass beads, etc., and further by chemically abrading with NaOH, etc.

The shape of the pellicle frame 2 is not limited to the rectangular shape shown in FIG. 1 (*a*), and various shapes can be employed according to the shape, etc. of the mask on which the pellicle is mounted.

An adhesive used in the pressure-sensitive adhesion layer 5 may be appropriately selected from various types of adhesives; an acrylic adhesive, a SEBS (poly(styrene-ethylene-butadiene-styrene))-based adhesive, and a silicone-based adhesive may preferably be used, and an acrylic adhesive or a silicone-based adhesive may more preferably be used.

The mask 4 on which the pellicle of the present invention is mounted may be either a transmission-type mask or a reflection-type mask, but is preferably a reflection-type mask from the viewpoint of the method by which it is held in exposure equipment, which is described later.

The transmission-type mask is used for example in transmission-type exposure equipment in which g line, i line, h line, KrF excimer laser light, ArF excimer laser light, etc. is used as exposure light.

Furthermore, the reflection-type mask is used for example in EUV exposure equipment in which extreme ultraviolet (EUV) light with a wavelength of 13.5 nm is used as exposure light.

FIG. 1 (*b*) shows one example of the cross-sectional constitution of a pellicle-equipped mask in a state in which the pellicle 1 of the present invention 1 is mounted on a mask 4.

As shown in FIG. 1 (*b*), a pressure-sensitive adhesion layer 5 is formed on an inner peripheral face of a pellicle frame 2 at a substantially uniform thickness. This pressure-sensitive adhesion layer 5 is adhered to a side face of the mask 4 that is substantially perpendicular to a front face (pattern face) of the mask 4 on which a mask image is formed. In this way, the mask 4 is mounted on the pellicle 1 in a state in which the mask is set into the pellicle frame 2 while the pattern face is facing toward the pellicle 1 side.

By mounting the pellicle 1 on the side face of the mask 4 in this way, it is possible to suppress stress coming in to the pattern face of the mask 4 in the perpendicular direction due to distortion of the pellicle frame 2. Because of this, deformation of the mask 4 due to distortion of the pellicle frame 2 can be suppressed as much as possible. In this way, change in the flatness of the mask 4 caused by mounting of the pellicle 1 can be suppressed as much as possible, thus suppressing deformation of the pattern face of the mask 4 as much as possible. It is therefore possible to reproduce a pattern drawn on the mask 4 more faithfully, thereby improving the mask overlay accuracy.

Furthermore, FIG. 1 (*c*) shows another example of the cross-sectional constitution of a pellicle-equipped mask in a state in which the pellicle 1 of the present invention 1 is mounted on a mask 4. The example shown in FIG. 1 (*c*) enables mounting of the pellicle 1 on the mask 4 to be carried out more easily compared with the example shown in FIG. 1 (*b*).

As shown in FIG. 1 (*c*), a pressure-sensitive adhesion layer 5 for which the thickness is smaller on the open end face side of a pellicle frame 2 is formed on the inner peripheral face of the pellicle frame 2. On the other hand, the side face of the mask 4 is inclined toward the inside in going from the reverse face of the mask 4 toward the pattern face. The inclination toward the inside is preferably linear. The pressure-sensitive adhesion layer 5 and the side face of the mask 4 have shapes that conform to each other, and the pressure-sensitive adhesion layer 5, which is thinner on the open end face side of the pellicle frame 2, conforms and adheres to the inclined side face of the mask 4. In this way, the mask 4 is mounted on the pellicle 1 in a state in which it is set into the pellicle frame 2 while the pattern face is facing toward the pellicle 1 side.

In an embodiment as shown in FIG. 1 (*c*), when an angle of inclination toward the inside is defined as θ, the relationship of Expression (1) preferably holds.

$$0.1 \leq \tan \theta \leq 0.5 \tag{1}$$

Another embodiment of the present invention relates a mask which has a side face inclined toward the inside in going from the reverse face of the mask toward the front face where the mask image is provided. The inclination toward the inside is preferably linear. When an angle of inclination toward the inside is defined as θ, the relationship of Expression (1) above preferably holds. The inclination is preferably provided uniformly around the entire mask.

When tan θ is within the above numerical ranges, a pellicle of the present invention is easily and firmly mounted to a mask for use in the present invention.

In the method for mounting the pellicle 1 of the present invention on the mask 4, as shown in FIG. 1 (*b*) and FIG. 1 (*c*), the mask 4 with the pattern face facing toward the pellicle 1 side is set into the pellicle frame 2. In addition to this, the side face of the mask 4 and the inner peripheral face of the pellicle frame 2 are adhered and fixed by means of the pressure-sensitive adhesion layer 5.

In a preferred method of mounting a pellicle according to the present invention, the pressure-sensitive adhesion layer has one end provided so as to be substantially flush with the open end face of the pellicle frame.

In the example shown in FIG. 1 (*c*), as described above, the thickness of the pressure-sensitive adhesion layer 5 is made thinner on the open end face side of the pellicle frame 2, the side face of the mask 4 where the pellicle 1 is mounted is inclined toward the inside in going from the reverse face of the mask 4 toward the pattern face, and the pressure-sensitive adhesion layer and the side face of the mask 4 have shapes that conform to each other. Because of this, the pressure-sensitive adhesion layer 5 can be easily contacted with the side face of the mask 4. In this way, in the example shown in FIG. 1 (c), the pellicle 1 can easily be mounted on the mask 4 compared with the example shown in FIG. 1 (b), in which the thickness of the pressure-sensitive adhesion layer 5 is substantially uniform and the side face of the mask 4 is substantially perpendicular to the pattern face of the mask 4.

Figure 2:
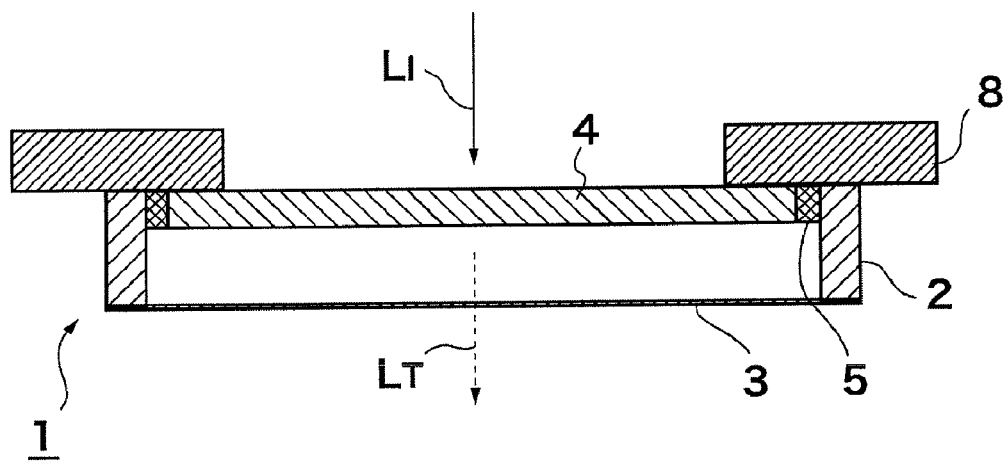
FIG. 2 is a sectional schematic view showing a state in which a mask equipped with the pellicle of the present invention is held in transmission-type exposure equipment.
Figure 3:
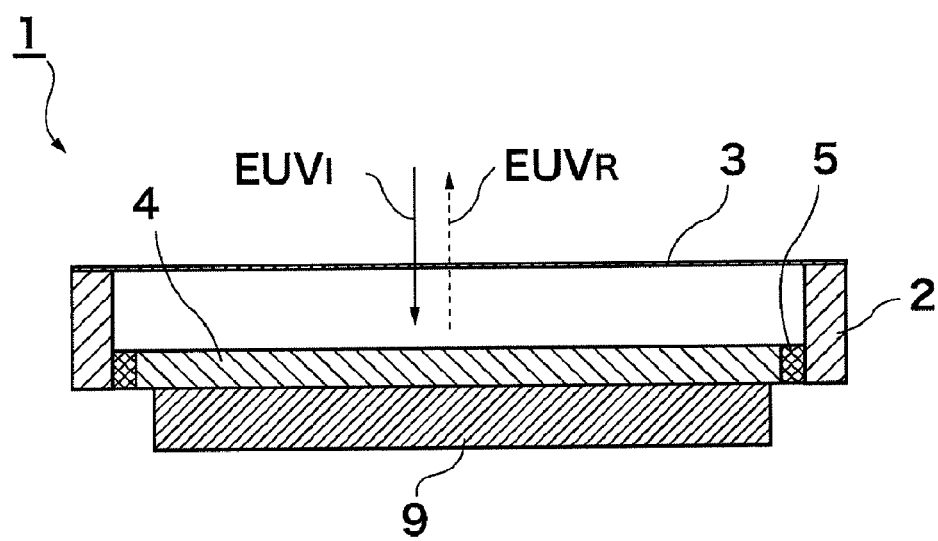
FIG. 3 is a sectional schematic view showing a state in which a mask equipped with the pellicle of the present invention is held in EUV exposure equipment.
Figure 5:
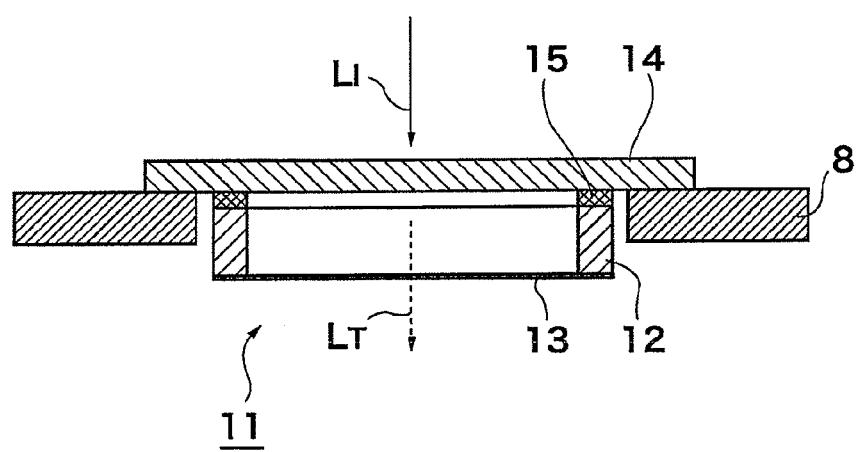
FIG. 5 is a sectional schematic view showing a state in which a mask equipped with a known pellicle is held in transmission-type exposure equipment.

A method for holding in exposure equipment a pellicle-equipped mask with the pellicle of the present invention mounted thereon is now explained by reference to FIG. 2, FIG. 3, and FIG. 5. FIG. 2, FIG. 3, and FIG. 5 are schematic sectional views showing the state in which a mask is held in the respective exposure equipment.

A method for holding a mask in transmission-type exposure equipment is explained first.

In the current situation, in an exposure step of a semiconductor process, etc., a transmission-type mask is generally used. In transmission-type exposure equipment employing such a transmission-type mask, a transmission-type mask equipped with a pellicle is held so that a pattern face closed off by the pellicle faces downward. Laser light as exposure light is incident from above on the reverse face of the mask, which is opposite to the pattern face, is transmitted by the mask and the pellicle film, and emerges downward. The laser light thus emerging downward projects a mask pattern on a substrate such as a wafer as an exposure object, and the mask pattern is replicated onto the substrate.

FIG. 5 is a schematic sectional view showing a state in which a transmission-type mask 14 equipped with the normal pellicle 11 shown in FIG. 4 is held in transmission-type exposure equipment.

In the case of the transmission-type mask 14 equipped with the normal pellicle 11 shown in FIG. 4, there is a closed-off region in which the pattern face of the mask 14 is closed off by the pellicle 11 and a non-closed-off region that is outside the closed-off region and is not closed off by the pellicle 11. Because of this, as shown in FIG. 5, opposite end parts of the non-closed-off region of the mask 14 with the pattern face facing downward are supported from below by means of a mask-holding part 8 of transmission-type exposure equipment. In this way, in the transmission-type exposure equipment, the transmission-type mask 14 equipped with the normal pellicle 11 shown in FIG. 4 is held in a state in which the pattern face equipped with the pellicle 11 is facing downward.

With regard to the transmission-type mask 14 in such a held state, laser light as exposure light is incident from above on the reverse face of the mask 14 opposite to the pattern face as shown in FIG. 5 (incident laser light $L_I$), is transmitted by the mask 14 and the pellicle film 13, and emerges downward (transmitted laser light $L_T$).

In contrast thereto, in the case of the transmission-type mask 4 equipped with the pellicle of the present invention 1 shown in FIG. 1, the pellicle 1 is mounted on the side face of the mask 4, and the entire mask 4 is set into the pellicle frame 2. Because of this, it is difficult to support it from below by means of the mask-holding part 8 of the transmission-type exposure equipment shown in FIG. 5. Therefore, in this case, it is preferable to hold the mask 4 by another method.

FIG. 2 is a schematic sectional view showing a state in which a transmission-type mask 4 equipped with the pellicle 1 of the present invention is held in transmission-type exposure equipment.

As shown in FIG. 2, in the case of the transmission-type mask 4 equipped with the pellicle 1 of the present invention 1, opposite end parts thereof are suspended by means of a mask-holding part 8 of the transmission-type exposure equipment in a state in which a pattern face equipped with the pellicle 1 is facing downward. In this way, in the transmission-type exposure equipment, the transmission-type mask 4 equipped with the pellicle 1 of the present invention is held in a state in which the pattern face equipped with the pellicle 1 is facing downward.

With regard to the transmission-type mask 4 in such a held state, laser light as exposure light is incident on the reverse face of the mask 4 opposite to the pattern face from above as shown in FIG. 2 (incident laser light $L_I$), is transmitted by the mask 4 and a pellicle film 3, and emerges downward (transmitted laser light $L_T$).

Unlike the above-mentioned transmission-type exposure equipment, in EUV exposure equipment a reflection-type mask is used. A method for holding a mask in EUV exposure equipment is explained below.

In the EUV exposure equipment, EUV light as exposure light is incident on a pattern face of a reflection-type mask and is reflected by the mask. EUV light thus reflected projects a mask pattern on a substrate such as a wafer as an exposure object, and the mask pattern is replicated onto the substrate. In this way, in the EUV exposure equipment, EUV light radiated as exposure light does not emerge from the reverse face of the mask. Therefore, the mask equipped with the pellicle of the present invention can easily be held by supporting the reverse face of the mask.

FIG. 3 is a schematic sectional view showing a state in which a reflection-type mask 4 equipped with the pellicle 1 of the present invention shown in FIG. 1 is held in EUV exposure equipment.

As shown in FIG. 3, in the case of the reflection-type mask 4 equipped with the pellicle 1 of the present invention, the reverse face thereof is supported from below by means of a mask-holding part 9 of the EUV exposure equipment. In this way, in the EUV exposure equipment, the reflection-type mask 4 equipped with the pellicle 1 of the present invention is held in a state in which a pattern face equipped with the pellicle 1 is facing upward.

With regard to the reflection-type mask 4 in such a held state, as shown in FIG. 3, EUV light as exposure light is incident on the pattern face of the reflection-type mask (incident EUV light $EUV_I$) and is reflected by the mask (reflected EUV light $EUV_R$).

In this way, the reflection-type mask equipped with the pellicle of the present invention can easily be held in the EUV exposure equipment by supporting the reverse face thereof from below.

Furthermore, in the case of the mask equipped with the pellicle of the present invention, as shown in FIG. 3, a pressure-sensitive adhesion layer 5 for fixing the pellicle 1 to the mask 4 is present between the inner peripheral face of a pellicle frame 2 and the side face of the mask 4. Because of this, in the EUV exposure equipment, the possibility of the pressure-sensitive adhesion layer being irradiated with EUV light scattered by the pattern face of the mask is very low. If the pressure-sensitive adhesion layer is irradiated with EUV light, there is a possibility that the pressure-sensitive adhesion layer will be degraded, decomposition gas, etc. will be generated, and the pellicle closed space will be contaminated.

However, when the pressure-sensitive adhesion layer is present on the side face of the mask, the pressure-sensitive adhesion layer is not irradiated with EUV light, and there is therefore an effect of preventing the pressure-sensitive adhesion layer from being hit by EUV light and degraded.

In accordance with the present invention, by mounting the pellicle on the side face of a mask, deformation of the mask due to the pellicle being mounted on the mask can be suppressed as much as possible. Therefore, in accordance with the present invention, deformation of a pattern face of the mask can be suppressed as much as possible, and it is therefore possible to reproduce a pattern drawn on the mask more faithfully, thereby improving the mask overlay accuracy.

EXAMPLES

Example 1

An aluminum alloy pellicle frame (external dimensions 158 mm square, height 10 mm, thickness 2 mm) was washed with pure water, an inner peripheral face thereof was coated with a silicone pressure-sensitive adhesive (product name: X-40-3122A) manufactured by Shin-Etsu Chemical Co., Ltd., and heated at 180° C. to thus cure the pressure-sensitive adhesive, thereby forming a pressure-sensitive adhesion layer. The thickness of the pressure-sensitive adhesion layer was 1 mm.

Subsequently, one end face of the frame was coated with a fluorine resin solution (concentration 6%) in which a fluorine resin (product name: Cytop CTX-S) manufactured by Asahi Glass was dissolved in a fluorinated liquid (product name: Novec 7300) manufactured by Sumitomo 3M, and the pellicle frame was then heated at 130° C. to thus evaporate the solvent and cure the fluorine resin, thereby forming an adhesive layer.

Following this, the adhesive layer side of the above pellicle frame was affixed to a pellicle film provided on an aluminum framework that was larger than the pellicle frame, the pellicle film was fixed to the adhesive layer by heating the adhesive layer, and portions outside the pellicle frame were removed, thus completing a pellicle.

When this pellicle was affixed to a side face of a mask with a flatness of 0.25 μm, the flatness of the mask was unchanged and remained at 0.25 μm.

Example 2

An aluminum alloy pellicle frame (external dimensions 158 mm square, height 10 mm, thickness 2 mm) was washed with pure water, and an inner peripheral face thereof was coated with a silicone pressure-sensitive adhesive (product name: X-40-3122A) manufactured by Shin-Etsu Chemical Co., Ltd., and allowed to stand for 1 hour. Subsequently, a quartz plate having external dimensions with a bottom side of 154 mm square, a top side of 152 mm square, side faces gradually narrowing toward the top, and a thickness of 7 mm, with the side faces coated with a release agent was contacted with the inside of the pellicle frame, and heating was then carried out at 180° C. to thus cure the pressure-sensitive adhesive. The quartz plate was removed from the pellicle frame, thus forming a pressure-sensitive adhesion layer having a thickness that gradually increased in going upward on the inner face of the frame.

Subsequently, one end face of the frame was coated with a fluorine resin solution (concentration 6%) in which a fluorine resin (product name: Cytop CTX-S) manufactured by Asahi Glass was dissolved in a fluorinated liquid (product name: Novec 7300) manufactured by Sumitomo 3M, and the pellicle frame was then heated at 130° C. to thus evaporate the solvent and cure the fluorine resin, thereby forming an adhesive layer.

Following this, the adhesive layer side of the above pellicle frame was affixed to a pellicle film provided on an aluminum framework that was larger than the pellicle frame, the pellicle film was fixed to the adhesive layer by heating the adhesive layer, and portions outside the pellicle frame were removed, thus completing a pellicle.

When this pellicle was affixed to a side face of a mask with a flatness of 0.25 μm, the side face being inclined toward the inside in going toward the front face provided with a mask image, the flatness of the mask was unchanged and remained at 0.25 μm.

Comparative Example

An aluminum alloy pellicle frame (external dimensions 149 mm×122 mm, height 5.8 mm, thickness 2 mm) was washed with pure water, one end face thereof was coated with a silicone pressure-sensitive adhesive (product name: X-40-3122A) manufactured by Shin-Etsu Chemical Co., Ltd., and heated at 180° C. to thus cure the pressure-sensitive adhesive, thereby forming a pressure-sensitive adhesion layer.

Subsequently, the opposite face of the frame was coated with a fluorine resin solution (concentration 6%) in which a fluorine resin (product name: Cytop CTX-S) manufactured by Asahi Glass was dissolved in a fluorinated liquid (product name: Novec 7300) manufactured by Sumitomo 3M, and the pellicle frame was then heated at 130° C. to thus evaporate the solvent and cure the fluorine resin, thereby forming an adhesive layer.

Following this, the adhesive layer side of the above pellicle frame was affixed to a pellicle film provided on an aluminum framework that was larger than the pellicle frame, the pellicle film was fixed to the adhesive layer by heating the adhesive layer, and portions outside the pellicle frame were removed, thus completing a pellicle.

When this pellicle was affixed to a front face of a mask provided with a mask image, the mask having a flatness of 0.25 μm, the flatness of the mask changed to 0.30 μm.

EXPLANATION OF REFERENCE NUMERALS AND SYMBOLS 1, 11: pellicle
2, 12: pellicle frame
3, 13: pellicle film
4, 14: mask
5, 15: pressure-sensitive adhesion layer
6, 16: atmospheric pressure adjustment hole (vent)
7, 17: dust filter
8: mask-holding part of transmission-type exposure equipment
9: mask-holding part of EUV exposure equipment
$L_I$: incident laser light
$L_T$: transmitted laser light
$EUV_I$: incident EUV light
$EUV_R$: reflected EUV light
θ: an angle of inclination toward the inside

What is claimed is:
1. A pellicle comprising a pellicle film, a pellicle frame having a rectangular cross-section and the pellicle film stretched over one end face thereof and having the other end face open, and a pressure-sensitive adhesion layer for adhering the pellicle frame to a mask, the pressure-sensitive adhe- sion layer being provided on an inner peripheral face of the pellicle frame, and the pressure-sensitive adhesion layer being capable of adhering to a side face of a mask having a mask image on a front face.

2. A pellicle-equipped mask comprising the pellicle according to claim 1 adhered to a mask.

3. A pellicle, comprising a pellicle film, a pellicle frame having the pellicle film stretched over one end face thereof and having the other end face open, and a pressure-sensitive adhesion layer for adhering the pellicle frame to a mask, the pressure-sensitive adhesion layer being provided on an inner peripheral face of the pellicle frame, and the pressure-sensitive adhesion layer being capable of adhering to a side face of a mask having a mask image on a front face, wherein the pressure-sensitive adhesion layer has a thickness that is thinner on the pellicle frame open end face side, the side face of the mask is inclined toward the inside in going from the reverse face of the mask toward the front face where the mask image is provided, and the pressure-sensitive adhesion layer and the mask side face have shapes that conform to each other.

4. The pellicle according to claim 3, wherein the relationship of Expression (1) holds when an angle of inclination toward the inside is defined as $\theta$, $$0.1 \leq \tan\theta \leq 0.5 \tag{1}.$$

5. A method of mounting a pellicle, comprising adhering the pellicle according to claims 3 to a side face of the mask that is inclined toward the inside in going from the reverse face of the mask toward the front face where the mask image is provided, thus adhering the side face of the mask to the pellicle frame inner peripheral face.

6. A pellicle-equipped mask comprising the pellicle according to claim 3 adhered to a mask.

7. A method of mounting a pellicle comprising a pellicle film and a pellicle frame having a rectangular cross-section and the pellicle film stretched over one end face thereof and having the other end face open, the method comprising fixing to a side face of a mask an inner peripheral face of the pellicle frame of the pellicle.

8. The method of mounting a pellicle according to claim 7, wherein fixing is carried out by a pressure-sensitive adhesive provided on the inner peripheral face of the pellicle frame.

* * * * *